Dec. 30, 1941.  A. Y. DODGE  2,268,376
ONE WAY CLUTCH
Filed Dec. 9, 1940
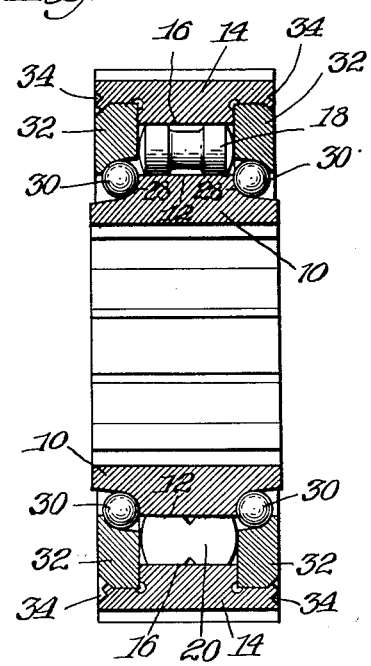
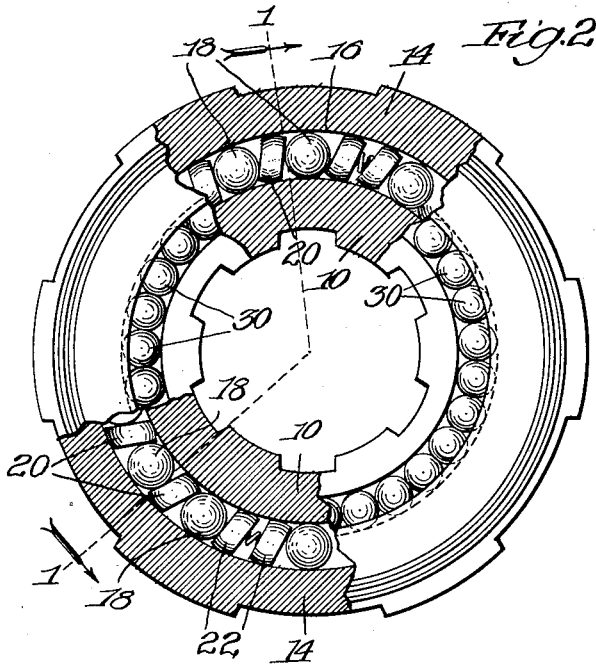
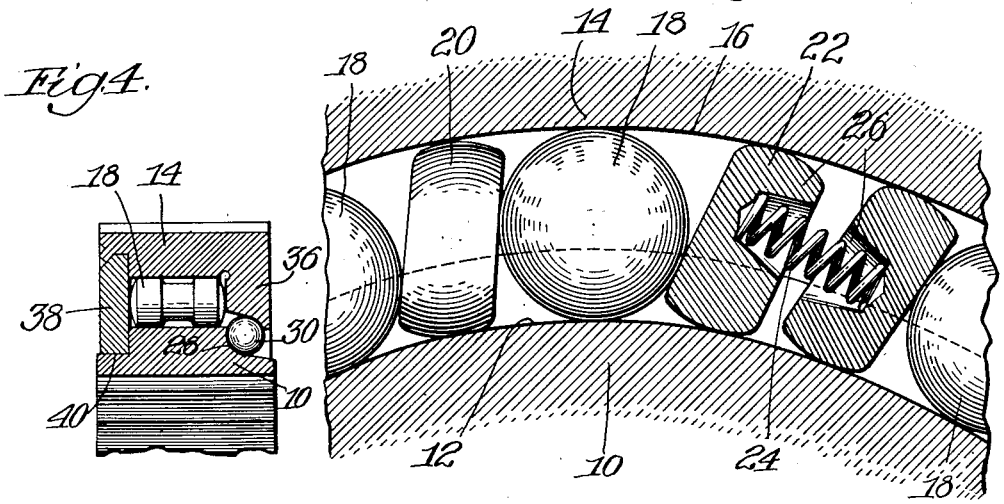
Inventor:
Adiel Y. Dodge,
By Dawson, Ooms & Booth,
Atty Patented Dec. 30, 1941

2,268,376

UNITED STATES PATENT OFFICE 2,268,376

ONE WAY CLUTCH

Adiel Y. Dodge, Rockford, Ill.

Application December 9, 1940, Serial No. 369,154

6 Claims. (Cl. 192—45.1)

This invention relates to one way clutch, and more particularly to a combined clutch and bearing for connecting two concentric members for rotation together in one direction while allowing free relative rotation in the opposite direction.

One of the objects of the invention is to provide a construction which may be manufactured and assembled simply and inexpensively, and yet which provides a reliable and strong gripping action in one direction and free rotation in the opposite direction.

Another object of the invention is to provide a one way clutch including both anti-friction elements and gripping members which are loosely mounted and yet which are held securely in place for immediate operation.

Still another object of the invention is to provide a one way clutch mechanism in which the operating parts are all standard parts so that clutches of different size and capacity may be assembled without the necessity of making special parts for each different clutch.

Still another object of the invention is to provide a one way clutch mechanism capable of carrying relatively heavy radial loads during overrunning and at the same time capable of carrying relatively high thrust loads.

The above and other objects and features of the invention will be apparent from the following description of the accompanying drawing, in which:

Figure 1 is an axial section through a one way clutch embodying the invention;

Figure 2 is a view at right angles to Figure 1, with parts in section;

Figure 3 is an enlarged partial section similar to Figure 2; and

Figure 4 is a partial section similar to Figure 1, of an alternative construction.

The clutch illustrated comprises an inner race member 10 splined in its interior to be received on a shaft or the like, and having on its exterior a smooth cylindrical surface 12. Concentrically arranged with the race member 10 is an outer race member 14, formed on its exterior with splines or the like, by which it may be attached to any desired shaft or collar. The race member 14 is provided with an inner cylindrical surface 16 facing and spaced from the surface 12.

A series of anti-friction elements, shown as rollers 18, is arranged between the two race members in rolling contact with the surfaces 12 and 16. As shown, the rollers are enlarged at their end portions and are cut away at their centers to provide for free circulation of lubrication, as more particularly described and claimed in my Patent No. 2,113,722. Between the rollers 18 are mounted a plurality of gripper elements 20 arranged in a series alternately with the rollers. The gripper elements are prismatic in section, having straight parallel sides and ends formed on circular arcs struck about centers spaced widthwise of the grippers, so that the diagonal length in one direction is greater than that in the other direction. The grippers are mounted between the rollers as best seen in Figure 3, so they normally tend to tilt in a direction to bring their narrow diagonal in alignment with a radius. In this position, the grippers clear the race surfaces so that the races may rotate freely relative to each other, the outer race moving in a clockwise direction relative to the inner race, as seen in Figures 2 and 3. It will be noted from Figure 3 that the grippers engage the bearing rollers on their opposite sides on opposite sides of their radial centers in such a way that pressure of the rollers tends to turn the grippers into a position in which they engage the races to prevent relative rotation therebetween. This pressure is not sufficient to interfere with free rotation of the races in the direction noted above, but if the inner race tends to overrun the outer race in a clockwise direction, the engagement of the gripper ends with the races will tilt the grippers, forcing them into tight engagement with the races and locking the races against relative rotation.

It will be noted that the bearing rollers 18 and the grippers 20 are freely mounted between the races without being separated by any cage or the like. In order to keep the elements properly in place, there is provided at one or more points around the races a pair of grippers 22 mounted adjacent each other and urged apart by a compression spring 24. The spring, as best seen in Figure 3, seats in sockets 26 in the facing gripper surfaces and the sockets in the two grippers are located eccentrically of the radial centers of the grippers. As seen in Figure 3, the socket at the left is above the radial center of the gripper and the gripper engages the bearing 18 at the left below its radial center, so that the spring and bearing tend to tilt the gripper into engaging position. Similarly, on the right the socket is below the radial center of the gripper which engages the bearing at the right above its radial center, so that it tends to tilt into locking position. In this way, any tendency toward looseness of the grippers and bearings is avoided and the parts are maintained in proper operating position.

In order to provide for carrying end thrust loads the inner ring 10 is cut away at its sides to form a pair of annular grooves 28 receiving a series of bearing balls 30. The outer ring 14 has secured thereto a pair of annular rings or flange members 32, formed with complementary grooves riding over the balls 30 and secured in place by crimping the ring 14 over them, as indicated at 34, or by spot welding or the like. With this construction the unit will carry a relatively heavy radial load on the bearing rollers 18 and will carry a thrust load in either direction.

Where a thrust load in only one direction is encountered, the construction shown in Figure 4 may be employed. In this construction the outer race 14 is formed with an integral flange 36 on one side which has an annular groove complementary to the groove 28 in the inner race for receiving the bearing balls 30. On the opposite side a collar 38 is secured to the outer race 14 and fits within a cut away portion 40 on the inner race to close that side of the unit. The collar 38 prevents relative movement axially between the races 10 and 14 under relatively light thrust loads and at the same time serves to hold the rollers and grippers in place.

While one embodiment of the invention has been shown and described in detail, it will be understood that this is illustrative only and is not intended as a definition of the scope of the invention, reference being had for that purpose to the appended claims.

What is claimed is:

1. A one way clutch mechanism comprising inner and outer concentric races, a series of antifriction elements loosely arranged between and engaging said races, a series of grippers loosely arranged between the races arranged alternately with and engaging the anti-friction elements, said grippers being engageable with the races to prevent relative rotation thereof in one direction, and resilient means supported by and engaging two adjacent grippers and urging them apart to maintain the grippers and anti-friction elements in contact.

2. A one way clutch mechanism comprising inner and outer concentric races, a series of antifriction elements loosely arranged between and engaging said races, a series of prismatic grippers loosely arranged between and contacting the anti-friction elements, said grippers being tiltable in one direction to release the races and in the other direction to engage the races to prevent relative rotation thereof in one direction and resilient means supported by and engaging two adjacent grippers and urging them apart to maintain the grippers and anti-friction elements in contact, said resilient means engaging the grippers eccentrically of their length to urge them to tilt in a direction to engage the races.

3. A one-way clutch mechanism comprising inner and outer concentric races, a series of bearing rollers loosely mounted between the races and engaging the races, a series of grippers alternating with the bearing rollers, each of said grippers having substantially parallel flat sides engaging the rollers and ends curved about spaced centers whereby when the grippers are tilted in one direction, they will engage the races to prevent relative rotation thereof in one direction, and resilient means between two adjacent grippers urging them apart to maintain the grippers and rollers in contact around the races.

4. A one way clutch mechanism comprising inner and outer concentric races, a series of bearing rollers loosely mounted between the races and engaging the races, a series of loosely mounted grippers alternating with the bearing rollers, each of said grippers having substantially parallel flat sides engaging the rollers and ends curved about spaced centers whereby when the grippers are tilted in one direction, they will engage the races to prevent relative rotation thereof in one direction, and a compression spring between and supported by two adjacent grippers engaging them at points spaced from their longitudinal centers and tending to tilt them in a direction to engage the races.

5. A one way clutch mechanism comprising inner and outer concentric races, a series of bearing rollers loosely mounted between the races and engaging the races, a series of loosely mounted grippers alternating with the bearing rollers, each of said grippers having substantially parallel flat sides engaging the rollers and ends curved about spaced centers whereby when the grippers are tilted in one direction they will engage the races to prevent relative rotation thereof in one direction, the grippers engaging rollers on their opposite sides at points on opposite sides of their longitudinal centers whereby pressure of the rollers tends to tilt the grippers in a direction to engage the races, and resilient means between and supported by two adjacent grippers tending to hold the rollers and grippers in contact, said resilient means engaging the grippers at points on opposite sides of their longitudinal centers and tending to tilt the grippers in a direction to engage the races.

6. A one-way clutch mechanism comprising inner and outer concentric races, a series of antifriction elements lying between and engaging the races to reduce frictional resistance to rotation therebetween, a series of gripper elements loosely arranged between the races alternately with and engaging the anti-friction elements, said gripper elements having substantially flat sides engaging the rollers and ends curved about spaced centers whereby when the grippers are tilted in one direction they will grip the races to hold them against rotation and when the grippers are tilted in the opposite direction they will free the races for rotation, and spring means loosely mounted between the races and between adjacent elements and at least in part supported by one element to urge the elements apart thereby to maintain the several elements in contact around the races.

ADIEL Y. DODGE.

CERTIFICATE OF CORRECTION.

Patent No. 2,268,376. December 30, 1941.

ADIEL Y. DODGE.

It is hereby certified that error appears in the printed specification of the above numbered patent requiring correction as follows: Page 2, first column, line 66, claim 3, after "of" insert --loosely mounted--; and second column, line 7, same claim, after "between" insert --and supported by--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.